United States Patent
Umbach et al.

[19]

[11] Patent Number: 5,946,637
[45] Date of Patent: Aug. 31, 1999

[54] BASE STATION WITH DETACHABLE CHARGER FOR CORDLESS PHONE SYSTEMS

[75] Inventors: Dirk Umbach, Hattingen; Dirk Michalzik, Gladbeck; Rainer Weber, Waldbronn, all of Germany

[73] Assignee: Nokia Mobile Phones Limited, Finland

[21] Appl. No.: 08/896,299

[22] Filed: May 16, 1997

[30] Foreign Application Priority Data

May 23, 1996 [DE] Germany .......................... 196 20 834

[51] Int. Cl.⁶ .................................................. H04M 1/02
[52] U.S. Cl. .......................... 455/573; 320/113; 320/115; 379/446; 455/90
[58] Field of Search ................... 455/90, 573; 379/446; 320/112, 113, 114, 115

[56] References Cited

U.S. PATENT DOCUMENTS

| | | | |
|---|---|---|---|
| 4,634,810 | 1/1987 | Grassl et al. | 455/573 |
| 4,882,745 | 11/1989 | Silver | 455/573 |
| 5,073,928 | 12/1991 | Shimanuki | 455/573 |
| 5,136,229 | 8/1992 | Galvin | 455/373 |
| 5,170,494 | 12/1992 | Levanto | 455/90 |
| 5,208,494 | 5/1993 | Ikonen et al. | 307/572 |
| 5,214,309 | 5/1993 | Saarnimo | 257/712 |
| 5,229,701 | 7/1993 | Leman et al. | 320/2 |
| 5,253,146 | 10/1993 | Halttunen et al. | 361/784 |
| 5,265,158 | 11/1993 | Tattari | 379/433 |
| 5,271,056 | 12/1993 | Pesola et al. | 379/58 |
| 5,327,482 | 7/1994 | Yamamoto | 455/407 |
| 5,343,136 | 8/1994 | Yamaguchi et al. | 455/573 |
| 5,511,240 | 4/1996 | Nishiyama | 455/573 |
| 5,519,711 | 5/1996 | Sointula | 370/95.3 |
| 5,584,055 | 12/1996 | Murui et al. | 455/89 |
| 5,603,103 | 2/1997 | Halttunen et al. | 455/90 |
| 5,691,618 | 11/1997 | Kobayashi et al. | 320/115 |
| 5,739,665 | 4/1998 | Bares | 320/115 |
| 5,801,513 | 9/1998 | Smith et al. | 320/113 |
| 5,828,966 | 10/1998 | Davis et al. | 455/573 |

FOREIGN PATENT DOCUMENTS 149106  6/1997  Japan .............................. H04M 1/02

*Primary Examiner*—Reinhard J. Eisenzopf
*Assistant Examiner*—Duc Nguyen
*Attorney, Agent, or Firm*—Perman & Green, LLP

[57] ABSTRACT

An inventive device (1) for cordless telephones (4), with which a base station (2) and at least one charging station (3) are associated in order to charge a battery of a cordless telephone (4) via the charging station (3) when the cordless telephone (4) is located in the charging station (3), is characterized by a mechanical connecting device (10, 11, 14, 17) for detachably connecting the charging station (3) and base station (2) to one another. As a result, more flexible possibilities of use for the charging station (3) are obtained.

14 Claims, 4 Drawing Sheets

BASE STATION WITH DETACHABLE CHARGER FOR CORDLESS PHONE SYSTEMS

DESCRIPTION

The invention relates to a device for cordless telephones according to the preamble of Patent claim 1.

Cordless telephones usually interact with a base station to which they are connected via a radio link. The base station is usually located in private households, office buildings or factory buildings etc. and permits cordless telephones which are associated with the same base station to communicate with one another, or with other subscribers via a private or public telephone network. The base station can be connected to these telephone networks via a data line or via a further radio link. Power is supplied to the base station generally via a feeder line from a power supply which is located in situ and may be, for example, in the form of a power supply unit.

For the power supply, the cordless telephones themselves contain in their interior a battery which has to be recharged from time to time. For this purpose, it is already known to use so-called charging stations which are separate from the base station. These charging stations are connected via a feeder line to a power source which is located in skit, for example to a power supply unit, and they contain in their interior a charging circuit for charging the battery of a cordless telephone when it has been inserted into a corresponding receptacle in the charging station.

On the other hand, base stations which have an integrated charging station are already known. In this case, the charging station is supplied with power via the base station.

The invention is based on the object of achieving, in the case of a device of the type mentioned at the beginning, a higher degree of flexibility with regard to the place of use of the charging station.

The means of achieving the defined object is specified in the characterizing part of Patent claim 1. Advantageous refinements can be found in the subclaims.

An inventive device for cordless telephones with which a base station and at least one charging station are associated, in order to charge a battery of a cordless telephone via the charging station when the said cordless telephone is located in the charging station, is characterized by a mechanical connecting device for detachably connecting the charging station and base station to one another.

The base station and charging station can thus be easily and quickly combined by fitting them together, or separated again from one another, as required, so that the entire device can be used in a more flexible way. In comparison with a device in which the charging station is non-detachably connected to the base station, the inventive device has the advantage that, for the case of charging the cordless telephone at a location which is remote from the base station, no further charging station is necessary since the charging station can be removed from the base station and carried along. For such an application, the costs of the entire system would be reduced. On the other hand, in contrast with a device in which charging stations which have already been separated from the base station are present, the advantage is obtained that one of these charging stations can be permanently connected to the base station in order to ensure that it is always possible for the cordless telephones to be charged, even at the location of the base station.

According to an advantageous refinement of the invention, the charging station can be fitted onto a top surface of the base station. This permits space-saving installation of the device which is composed of a base station and charging station.

According to another advantageous refinement of the invention, the mechanical connecting device is located in the region of the top surface of the base station and can therefore be easily found and activated. The mechanical connecting device may also be arranged here, for example centrally in this surface, thus avoiding the device becoming wider as a result of the mechanical connecting device.

According to yet another refinement of the invention, the mechanical connecting device is constructed as a latching or snap-on mechanism. As a result, the base station and charging station can be connected to one another, and separated from one another again, very easily without a special tool being necessary for this.

According to one development of the invention, positioning means are provided in order to position the charging station in relation to the base station when both are connected to one another. If the charging station does not assume the prescribed position in relation to the base station, the positioning means prevent the charging station from becoming closer to the base station, even as one is being fitted onto the other, so that a mechanical connection is not formed. This connection comes about only when the two stations are aligned correctly in relation to one another, with the result that incorrect positioning of the charging station is avoided.

In this context, parts of the mechanical connecting device may also serve as positioning means, giving rise to a more compact design.

The mechanical connecting device can preferably take the form of a plug-in connection, if said device is present between the top surface of the base station and the bottom surface of the charging station. Here, a plug-forming projection may protrude from one of these surfaces and a bush-forming opening may be present in the other surface.

According to a very advantageous refinement of the invention, there is, in addition to the mechanical connecting device, also an electric connecting device for electrically connecting the charging station and base station to one another in order to supply the charging station with power via the base station when both are connected mechanically to one another. For this case, the charging station no longer needs to remain connected to its original feeder line, which makes the unit composed of a base station and charging station easier to install.

Preferably, the electric connecting device may be arranged here in the region of the top surface of the base station, with the result that the mechanical and electric connections can be produced simultaneously when the charging station is fitted onto the top surface of the base station. Here, the electric connecting device may be constructed as a plug/bush connection, which considerably simplifies the procedure of fitting the charging station onto the base station.

According to yet another refinement of the invention, the electric connecting device is integrated into the mechanical connecting device. This has the advantage that both connecting devices are located spatially right next to one another, with the result that the alignment procedure is simplified when the charging station is fitted onto the base station. In this context, the mechanical connecting device may also be constructed, at least to a certain degree, as an electric connecting device. For the case of latching means, these may be composed of metal, for example, with the result that, on the one hand, they achieve the mechanical latching effect and, on the other hand, are able to produce an electric connection between the base station and charging station.

According to another advantageous development of the invention, the charging station contains not only a charging circuit but also a battery. As a result, it is possible to operate the charging station independently of a mains connection, for example in the open air, for a certain period.

Here, the charging station may contain a switch-over device for switching over the charging circuit in such a way that, when there is an external power supply, the said charging circuit can charge the batteries both of the cordless telephone and of the charging station, while, in the event of the external power supply being interrupted, the battery of the cordless telephone can be charged by the battery of the charging station.

External power supply means that the charging station is connected either to the base station or to a separate feeder line. In contrast, interruption of the external power supply means that the charging station has been removed from the base station or that the separate feeder line has been removed from the charging station. The switching-over device must be capable of detecting these states, for which purpose it interacts with a suitable mechanical or electric detector device.

In a development of the invention, the battery of the charging station may also be located in a separate housing component which can be removed therefrom. Otherwise, it would continue to be possible to connect the charging station to the base station. The charging station could then have the separate housing component added to it if desired if this is considered necessary for specific reasons.

Moreover, each charging station may be constructed in such a way that it can simultaneously accommodate a plurality of cordless telephones and charge their batteries. This then takes place in parallel mode. For example, the charging station could be equipped with two recesses, one located next to the other, for receiving one cordless telephone each.

Exemplary embodiments of the invention are described in more detail below with reference to the drawing, in which.

Figure 1:
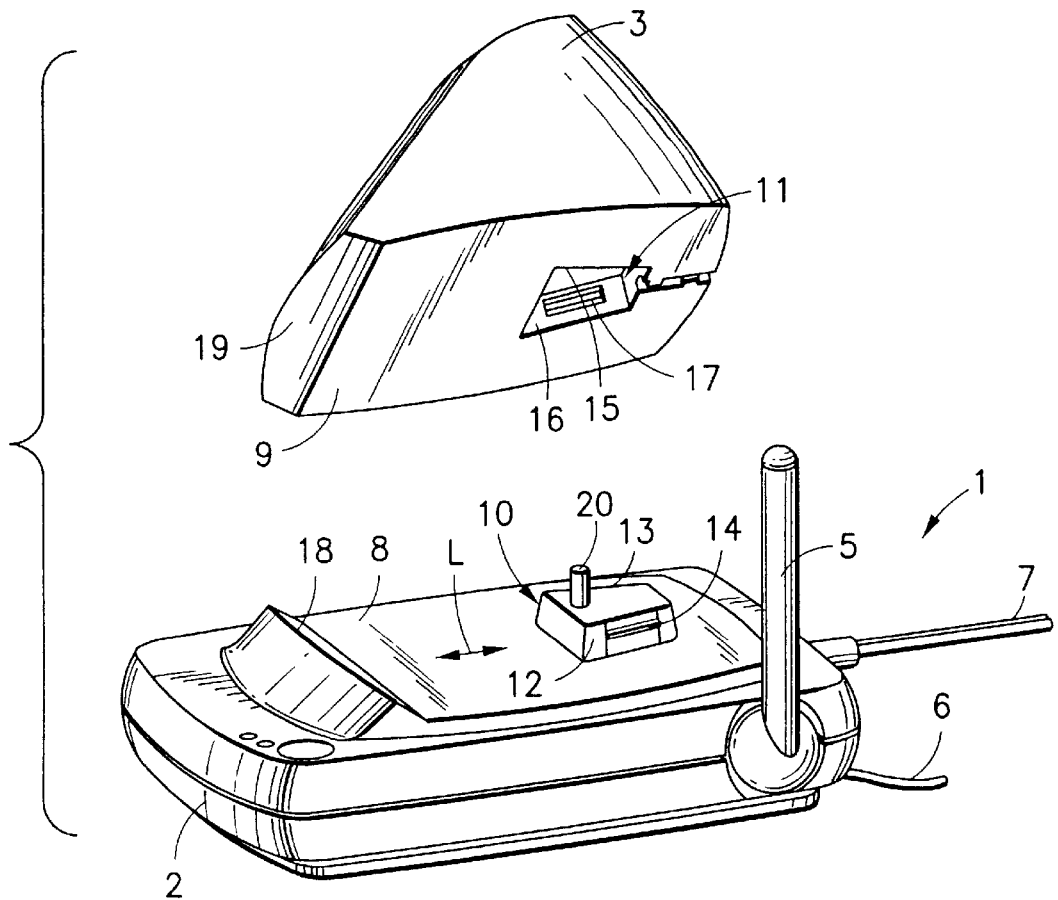
FIG. 1 shows a device composed of a base station and charging station, in a state in which the charging station has been removed from the base station.

FIG. 1 shows an inventive device 1, composed of a base station 2 and at least one charging station 3. Here, the base station 2 and the charging station 3 are illustrated separated from one another.

Figure 9:
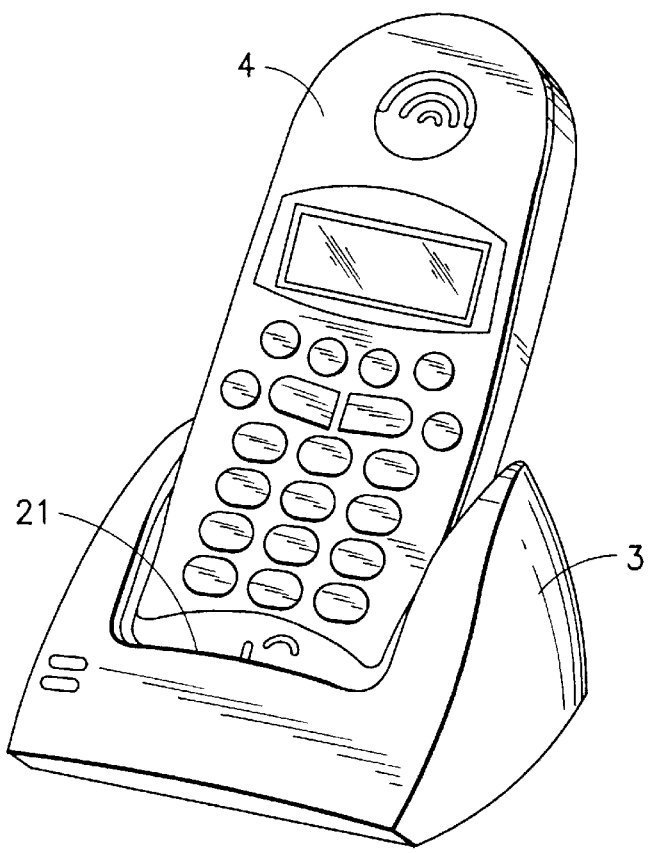
FIG. 9 shows a perspective view of the charging station from FIG. 7 or 8 with a cordless telephone inserted into it.

The base station 2 is connected via a radio link to one or more cordless telephones 4 or mobile phones, one of which is shown in FIG. 9. In order to set up the radio link, the base station 2 is provided with a swivellable antenna 5. The base station 2 is connected to a public or private telephone network via a data line 6. A plurality of cordless telephones 4 which are associated with the base station 2 can thus have radio contact with one another via the base station 2 or can be connected to another subscriber of the telephone network via the base station 2, and the data line 6 as well as the said telephone network. In order to supply power to the transmitting and receiving devices which are present (and not illustrated) within the base station 2, the base station 2 is connected to a feeder line 7 which is supplied via a power supply unit which is connected to the local power network. For example, a direct voltage of 6 V is applied to the feeder line 7.

So that the charging station 3 can be fitted onto the base station 2, the base station 2 is provided with an upper receiving surface 8, which is constructed in the present case as a planar surface. Correspondingly, the charging station 3 has a planar fitting surface 9 on its lower side. However, it is not necessary for both surfaces 8 and 9 to be planar, instead they could even have curvatures. However, they would then have to be curved in the same way so that they can be fitted together.

In the region of these surfaces 8 and 9 there is, lying on the longitudinal axis of the device and displaced somewhat in the direction of the feeder line 7, a mechanical and electric connecting device for mechanically and electrically connecting the base station 2 and charging station 3 to one another.

The mechanical connecting device is composed of a base 10 which protrudes beyond the receiving surface 8 and a recess 11, having approximately the same shape, in the lower fitting surface 9 of the charging station 3. The peripheral shapes of the base 10 and recess 11 are selected such that for the charging station 3 there is only one position in relation to the base station 2 in which it can be fitted onto the receiving surface 8 of the base station 2. Only in this position does the base 10 fit into the recess 11. In the present case, the base 10 and the recess 11 are of trapezoidal construction, viewed parallel to the surfaces 8 and 9 in each case. Here, the parallel sides of the trapezium lie perpendicular to the longitudinal direction of the handset 1. The obliquely running sides of the trapezium each run at an angle to this longitudinal direction. The said direction is indicated in FIG. 1 by the reference symbol L.

The base 10 has in the region of its obliquely running trapezium sides 12 and 13 in each case a latching projection 14 of sprung construction, the said latching projection protruding outwards beyond these sides 12, 13 and being prestressed towards the outside by spring force. In contrast, on the obliquely running trapezium sides 15 and 16 of the recess 11 there are notches 17 for the said latching projections 14. In FIG. 1, only the latching projection 14 on the trapezium side 12 of the base 10 can be seen. The latching projection on the trapezium side 13 is covered by the base 10. The same applies to the notches 17. Here, owing to the selected positioning of the charging station 3, only the notch 17 on the trapezium side 16 can be seen. If the surfaces 8 and 9 are fitted one on the other, the latching projections 14 therefore engage in the respective notches 17 and thus constitute a secure connection between the base station 2 and the charging station 3. Then, owing to the selected shape of the mechanical connecting device 10, 11, it is no longer possible to turn the charging station 3 in relation to the base station 2. An additional protection against turning is obtained by way of a surface 18, at an angle with respect to the receiving surface 8, in the front region of the base station 2 against which a surface 19, at an angle with respect to the fitting surface 9, of the charging station 3 abuts when the surfaces 8 and 9 are fitted one on the other.

An electric connecting device is integrated into the mechanical connecting device 10, 11.

The said electrical connecting device is, on the one hand, a plug 20 which projects perpendicularly from the top surface of the base 10. This plug 20 is of two-pole construction and conducts a feed voltage as well as earth potential to the charging station 3. For this purpose, the charging station 3 is equipped in the region of its recess 11 with a corresponding sleeve, which cannot be seen in the present case and into which the plug 20 is inserted when the charging station 3 is fitted with its fitting surface 9 onto the receiving surface 8 of the base station 2.

Figure 2:
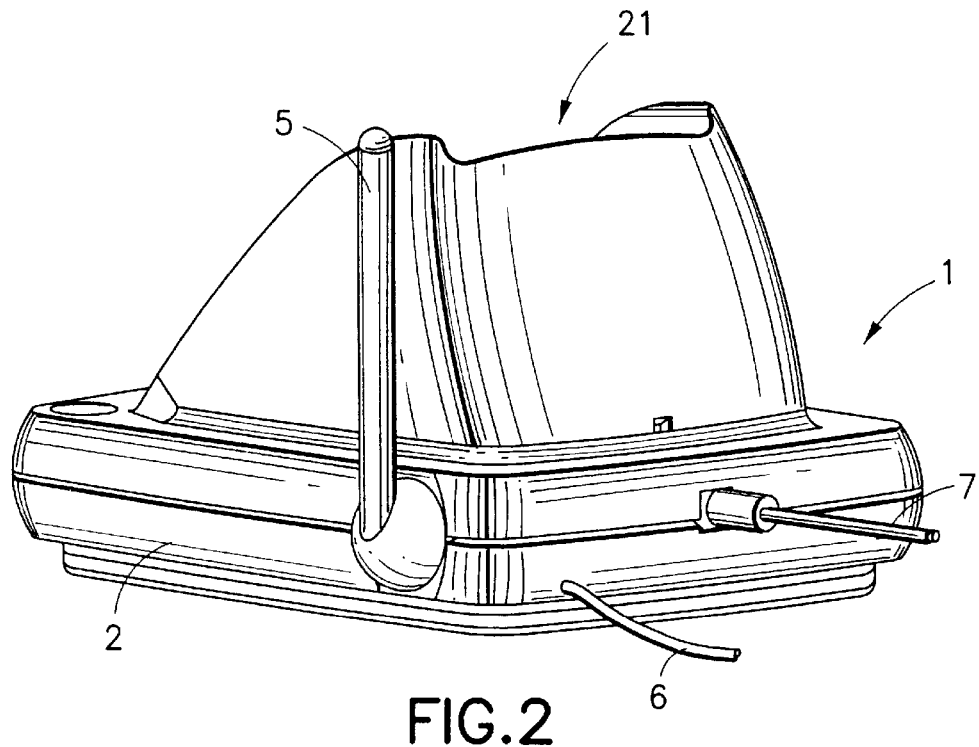
FIG. 2 shows a device composed of a base station and charging station, in a state in which the charging station has been fitted onto the base station.

In FIG. 2, the inventive device 1 is shown in a state in which the charging station 3 is fitted onto the base station 2. Here, supply potential and earth potential are also conducted to the charging station 3, and to the charging circuit which is present in the charging station 3, via the feeder line 7 and also via the electric connecting device 20. In the present case, the charging station 3 does not have a cordless telephone fitted into it. Only one receptacle 21, provided for receiving a cordless telephone 4, can be seen in the charging station 3. If there is a cordless telephone 4 in this receptacle 21, the battery of the cordless telephone 4 is electrically connected to the charging circuit of the charging station 3 via a suitable contact device.

Figure 3:
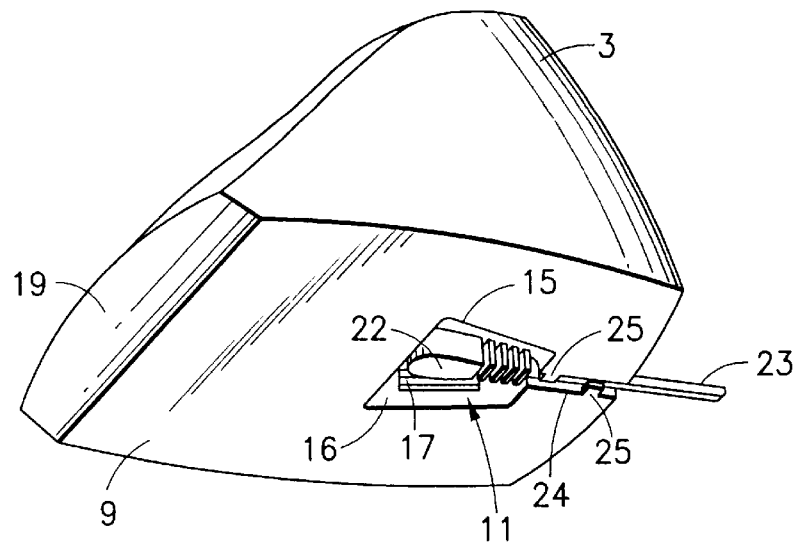
FIG. 3 shows a perspective view of the charging station obliquely from below.

FIG. 3 shows a perspective view of the charging station 3 from obliquely below. As already mentioned, in order to receive the plug 20 there is an appropriately constructed sleeve in the region of the surface of the recess 11 which is parallel to the fitting surface 9. When the charging station 3 has been removed from the base station 2, a plug 22 can also be inserted into this sleeve, the said plug 22 being connected to a further feeder line 23 in order, in this way, to transmit supply and earth potential to the charging circuit of the charging station 3. The further feeder line 23 can be connected to the local power supply, for example via a power supply unit. So that, for this case, the charging station 3 can be fitted with its fitting surface 9 onto a suitable supporting surface, the further feeder line 23 is fed through a conduit 24 which is provided in the fitting surface 9 and which extends from the recess 11 to the rear side of the charging station 3. Here, tongues 25 which run transversely with respect to the conduit are provided, the said tongues 25 being able to prevent the further feeder line 23 from dropping out of the conduit 24 and also being able to act as a tension relief.

Figure 4:
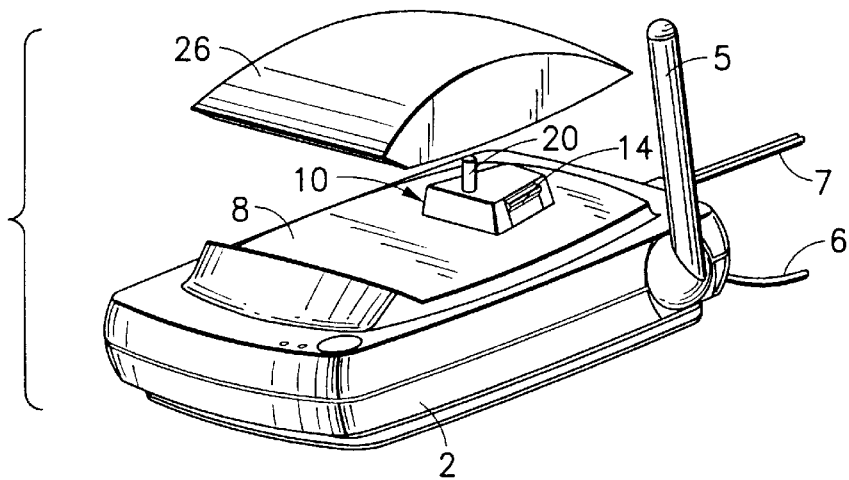
FIG. 4 shows a perspective view of the base station obliquely from above with a cover which can be fitted onto it.

FIG. 4 shows the base station 2 without charging station 3. If the base station 2 is used in this state, a cover 26 can be fitted onto it in order to protect the mechanical and electric connecting device. This cover 26 is of identical construction in its lower region to the lower region of the charging station 3 and can thus be attached to the base station 2 by means of the latching projections 14. The said cover 26 can also only be fitted onto the receiving surface 8 in a specific position. In this way, the design of the base station 2 can be harmoniously supplemented in its upper region by the cover 26.

Figure 5:
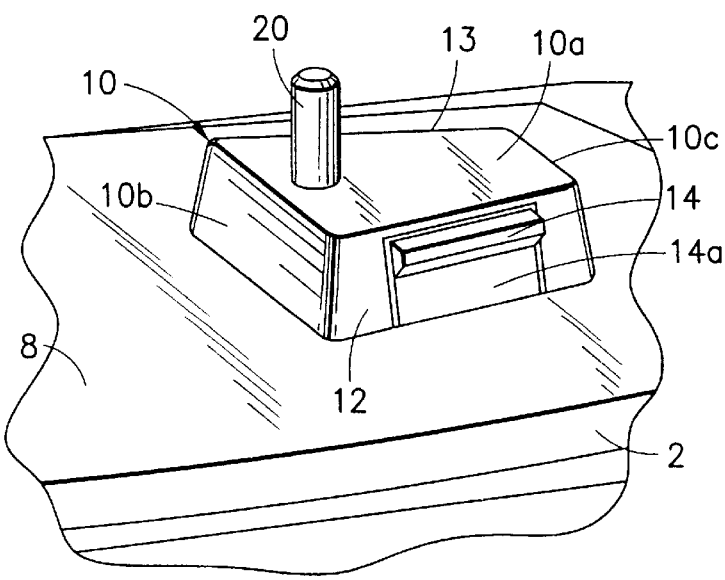
FIG. 5 shows an enlarged illustration of a mechanical and electric connecting device for connecting the base station and charging station to one another.

FIG. 5 shows an enlarged portion of the base station 2 in the region of the base 10. The base 10 is, as already mentioned, of trapezoidal construction and protrudes beyond the receiving surface 8. Its top surface 10a lies parallel to the receiving surface 8, while its side surfaces lob, 10c which run perpendicularly to the longitudinal direction L, as well as its sides 12 and 13, run towards one another in the direction of the free end of the base. The entire base 10 thus tapers in the direction of its free end. The same applies, in the opposite direction, to the recess 11.

The latching projections 14 are located at the top, or free, end of a respective catch 14a which, in the state of rest, is aligned with the side wall 12 and 13, so that then the latching projection 14 protrudes beyond the respective side wall 12, 13. The catch 14a can be coupled, for example to the receiving surface 8, or integrally connected thereto in a swivellable fashion, so that it can be pressed into a corresponding recess in the base 10 counter to a spring force. This goes so far that the tip of the latching projection 14 comes to rest in the respective side surface 12, 13. The latching projections 14 are pressed into the recess in the base 10 by the inner walls 15, 16 of the recess 11 when the base 10 is inserted therein. In order to facilitate this procedure, the latching projections 14 may be bevelled towards their free end. In order to support the latching projections 14 in an elastic fashion, the catches 14a may be constructed as sprung catches or may be prestressed by means of a spring which comes to rest behind the respective catches 14a, that is to say between them and the base 10.

Figure 6:
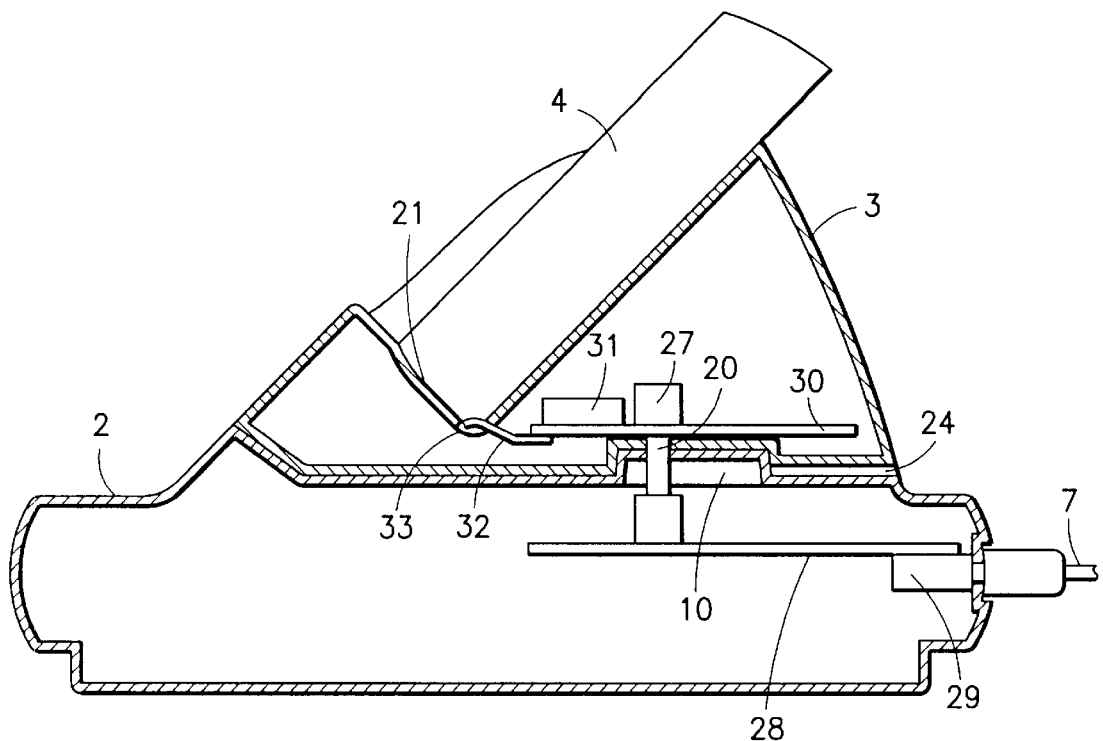
FIG. 6 shows a longitudinal section through the device which is composed of a base station and charging station and has a cordless telephone inserted into it.

FIG. 6 shows a longitudinal section through the inventive device, that is to say a section along the line L in FIG. 1. In the present case, the charging station 3 is fitted onto the base station 2 and mechanically and electrically connected thereto. At the same time, the base 10 engages in the recess 11, so that a secure connection is achieved between the base station 2 and charging station 3 by means of the latching projections 14. The plug 20 which protrudes out of the base 10 is inserted into the sleeve 27 of the charging station 3, so that there is also an electric connection between the power supply component of the base station 2 and the charging station 3. The plug 20 and sleeve 27 are each of two-pole design in order to be able to transmit feed potential and earth potential.

The plug 20 is supported, inter alia, by a printed circuit board 28 which is located in the interior of the base station 2. This printed circuit board 28 is connected to a through-connecting element 29 which is attached to the rear wall of the base station 2 and serves to connect through the feeder line 7 into the interior of the base station 2. The electric connection between the feeder line 7 and plug 20 is made by suitable cable routing on the printed circuit board 28.

Within the charging station 3, a further printed circuit board 30 lies parallel to the bottom surface of the said charging station 3. The said printed circuit board 30 is attached there in a suitable way and has the already mentioned sleeve 27 for receiving the plug 20. On the printed circuit board 30 there is also a charging circuit 31 which is electrically connected to the sleeve 27 and serves to charge a cordless telephone 4 which is inserted into the already mentioned receptacle 21 of the base station 3. In this case, a connecting contact 32, which is connected to the further printed circuit board 30, is electrically connected, on the one hand, to the charging circuit 31 and, on the other hand, to a contact of the cordless telephone 4 which itself leads to the battery accommodated in the cordless telephone 4. Here, the connecting contact 32 projects through a bottom opening 33 in the receptacle 21.

Figure 7:
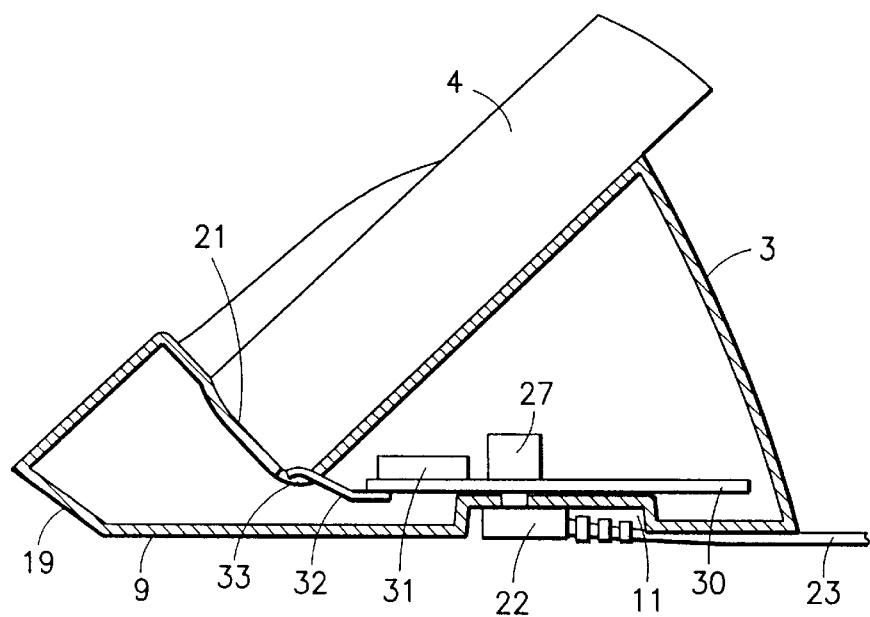
FIG. 7 shows a longitudinal section only through the charging station with a cordless telephone inserted into it.

A longitudinal section, corresponding to FIG. 6, through the charging station 3 only is shown in FIG. 7. Identical elements to those in FIG. 6 are provided with the same reference symbols and are not described again. In contrast with the illustration according to FIG. 6, in accordance with FIG. 7 the plug 22 is inserted into the sleeve 27. Via this plug 22, connected to the further feeder line 23, feed potential and earth potential are likewise transmitted to the charging station 3, but now from a power supply unit (not illustrated) which may itself be connected to the local power supply.

Figure 8:
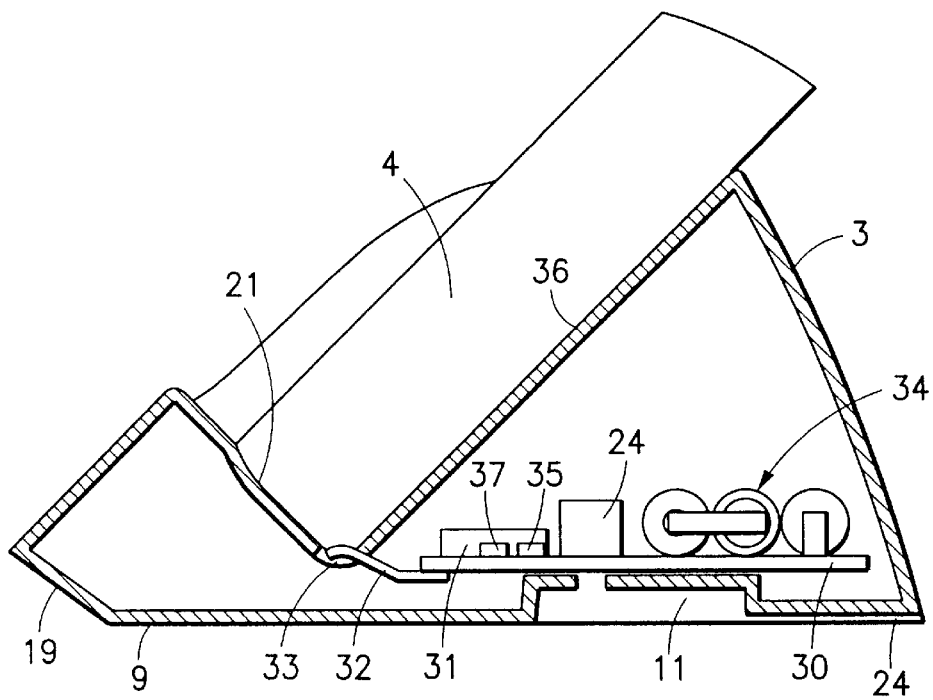
FIG. 8 shows a longitudinal section through another embodiment of the charging station with a cordless telephone inserted into it.

FIG. 8 shows a longitudinal section, corresponding to FIG. 7, through a further charging station 3 which corresponds externally to the charging station 3 according to FIG. 7. Identical components are in turn provided with the same reference symbols and are not described again.

In contrast with the charging station 3 according to FIG. 7, in the case of the charging station 3 according to FIG. 8 there is also a battery 34 on the further printed circuit board 30. By means of this battery 34, a cordless telephone 4 which has been inserted into the charging station 3 can be charged in the previously described manner when the charging station 3 is not connected to an external power supply. For this purpose, the battery 34 is electrically connected to the charging circuit 3 in a suitable manner. If, on the other hand, the charging station 3 is connected to an external power supply, for example to the feeder line 23 via the plug 22 in accordance with FIG. 7, on the one hand, or to the feeder line 7 via the plug 20 in accordance with FIG. 6, on the other hand, it is possible to charge both the battery of the cordless telephone 4 and the battery 34 via the charging circuit 31. This can take place simultaneously or at different times depending on whether priority is given to one battery or the other. An appropriate priority controller may be provided in the charging circuit 31. The charging circuit 31 can likewise contain a detector device by means of which it is determined whether or not the charging station 3 is connected to an external power supply, that is to say to one of the plugs 20 or 22. This detector circuit is provided with the reference symbol 35.

A switch-over device 37 which serves to actuate or switch over the charging circuit 31 is electrically connected to the detector circuit 35. If the detector circuit 37 detects that the charging station 3 is being supplied with power externally, the switch-over device 37 switches the charging circuit 31 into a state in which the battery of the cordless telephone 4 and/or the battery 34 of the charging station 3 can be charged, depending on the priority assignment. If, on the other hand, the detector circuit 35 detects that there is no external power supply present for the charging station 3, the switch-over device 37 switches over the charging circuit 31 as a function of this result of the detector, in such a way that the battery of the cordless telephone 4 is now charged by the battery 34 of the charging station 3.

According to one refinement of the invention, the battery 34 may also be located in a separate housing component which can be removed from the charging station 3. This is no longer illustrated in detail. This housing component may be acquired additionally and added to the charging station 3 as desired when the extra function of charging the cordless telephone 4 by means of a battery 34 is desired. The connecting surface between the additional housing component and the rest of the charging station 3 can then come to rest in such a way that it lies parallel to the rear wall 36 of the receptacle 21. That wall of the charging station 3 which is at the rear when the additional housing component has been removed would then likewise lie parallel to the rear wall 36 of the receptacle 21, so that the charging station 3 could then be coupled on perpendicularly by means of its rear wall. When the cordless telephone 4 is located in the receptacle 21 it would then be in an approximately perpendicular position. In this case too, it could be ensured that it would still be possible to charge the battery of the cordless telephone 4 via the supply line 23 and the plug 22.

FIG. 9 shows the charging station 3 with the cordless telephone 4 inserted into the receptacle 21, in a perspective view obliquely from the front. In principle, the charging station 3 could also be designed in such a way that it has two or more recesses 21 which are located one next to the other and into which in each case one of the cordless telephones 4 can be inserted in order to be charged. Here, the charging procedure may take place in parallel. It is also possible to make the receptacles 21 of differing designs in order to be able to accommodate and charge different makes of cordless telephones 4. The position of the connecting contacts 32 and the position of the associated openings 33 could be selected appropriately.

We claim:

1. A device for a cordless telephone with which a base station and a charging station is associated in order to charge a battery of a cordless telephone via the charging station when said cordless telephone is located in the charging station, characterized by:

the base station (2) having an upper receiving surface (8), and the charging station (3) having a lower surface which lower surface includes a fitting surface (9);

a mechanical connecting device disposed between said base station (2) and said charging station (3);

said mechanical connecting device having a base 10 connected to and extending beyond the receiving surface (8) of said base station and a recess (11) formed in the lower surface of said charging station, each of said base and said recess being correspondingly sized and shaped such that the base is receivable in said recess when each of said base and said recess is oriented in a given direction;

each of said base and said recess having a peripheral shape and the peripheral shapes of the base (10) and the recess (11) tapering from one end thereof to another such that for the charging station (3) there is only one position in relation to the base station (2) in which the charging station can be fit onto the receiving surface (8) of the base station (2); and an electric connecting device 20 integrated into the mechanical connecting device for conducting a fed voltage to the charging station.

2. Device according to claim 1, characterized in that the charging station (3) can be fitted onto a top surface (8) of the base station (2).

3. Device according to claim 2, characterized in that the mechanical connecting device (10, 11, 14, 17) is located in the region of the top surface (8) of the base station (2).

4. Device according to claim 1, characterized in that the mechanical connecting device (10, 11, 14, 17) is a latching/snap-on mechanism.

5. Device according to claim 1 characterized in that positioning means (10b, 10c, 12, 13) are provided in order to position the charging station (3) in relation to the base station (2) when both are connected to one another.

6. Device according to claim 5, characterized in that parts of the mechanical connecting device serve as positioning means.

7. Device according to claim 1, characterized by an electric connecting device (20, 27) for electrically connecting the charging station (3) and base station (2) to one another when they are mechanically connected to one another.

8. Device according to claim 7, characterized in that the electric connecting device (20, 27) is arranged in the region of the top surface (8) of the base station (2).

9. Device according to claim 7, characterized in that the electric connecting device (20, 27) is constructed as a plug-in connection.

10. Device according to claim 7, characterized in that the electric connecting device (20, 27) is integrated into the mechanical connecting device (10, 11, 14, 17).

11. Device according to claim 7, characterized in that the mechanical connecting device is also constructed as an electric connecting device.

12. Device according to claim 1, characterized in that the charging station (3) contains not only a charging circuit (31) but also a battery (34).

13. Device according to claim 12, characterized in that the charging station (3) contains a switch-over device (37) for switching over the charging circuit (31) in such a way that, when there is an external power supply, the said charging circuit (31) can charge the batteries both of the cordless telephone (4) and of the charging station (3), while, in the event of the external power supply being interrupted, the battery of the cordless telephone (4) can be charged by the battery (34) of the charging station (3).

14. Device according to claim 12, characterized in that the battery (34) of the charging station (3) is located in a separate housing component which can be removed therefrom.

* * * * *